Nov. 25, 1930.　　　　H. W. TOOL　　　　1,782,554
ANIMAL CHUTE FOR AUTOMOBILE TRUCKS
Filed July 5, 1929　　　2 Sheets-Sheet 1

Inventor
H. W. Tool
By Emil F. Lange
Attorney

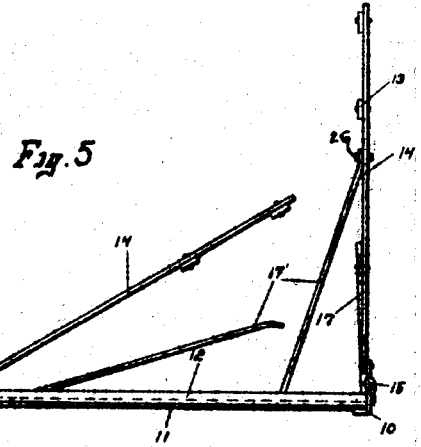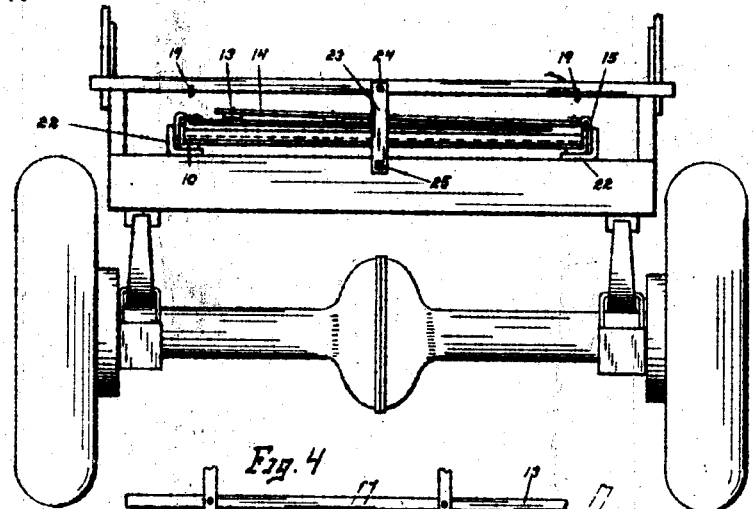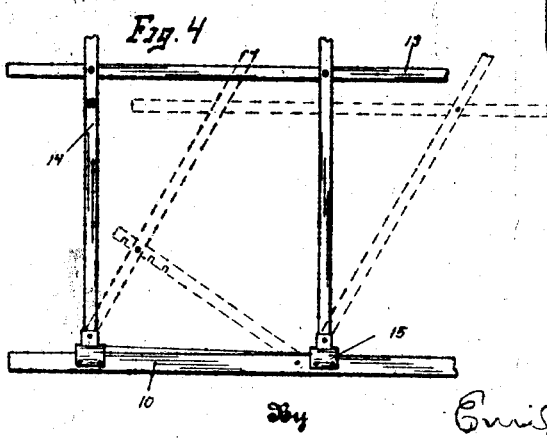

Patented Nov. 25, 1930

1,782,554

UNITED STATES PATENT OFFICE

HAROLD W. TOOL, OF MURDOCK, NEBRASKA

ANIMAL CHUTE FOR AUTOMOBILE TRUCKS

Application filed July 5, 1929. Serial No. 375,994.

My invention relates to animal chutes and particularly to loading and unloading chutes.

One object of my invention is the provision of a compact and light weight chute.

Another of my objects is the provision of a chute which is foldable into a small space.

Another of my objects is the provision of a floor with side walls for the chute, the side walls being adjustable to effectively close the spacing between the side walls of the chute and the rear edges of the side walls of a vehicle, provision being made for latching the side walls of the chute in adjusted position.

Having in view these objects and others which will be pointed out in the following description, I will now refer to the drawings, in which Figure 1 is a view in side elevation of the rear portion of an automobile truck with my chute secured thereto.

Figure 4 is a side elevational view of a fragment of one of the walls of the chute showing the pivotal movements of the standards and showing the means for latching the side walls in adjusted position.

Figure 5 is a view in rear elevation of the chute showing the side walls in open and in partly open position respectively.

Figure 6 is a view in rear elevation of the truck showing the compartment in which the folded chute may be stored during the travel of the truck and showing also the latch for retaining the folded chute during travel.

The floor of the chute has angle iron side rails 10 connected together by means of a floor proper 11 which is preferably made from sheet metal. The angle iron members 12 connect the side rails 10 and they are also secured transversely to the floor 11 so that they constitute braces for the floor and treads for the animals.

Figure 1:
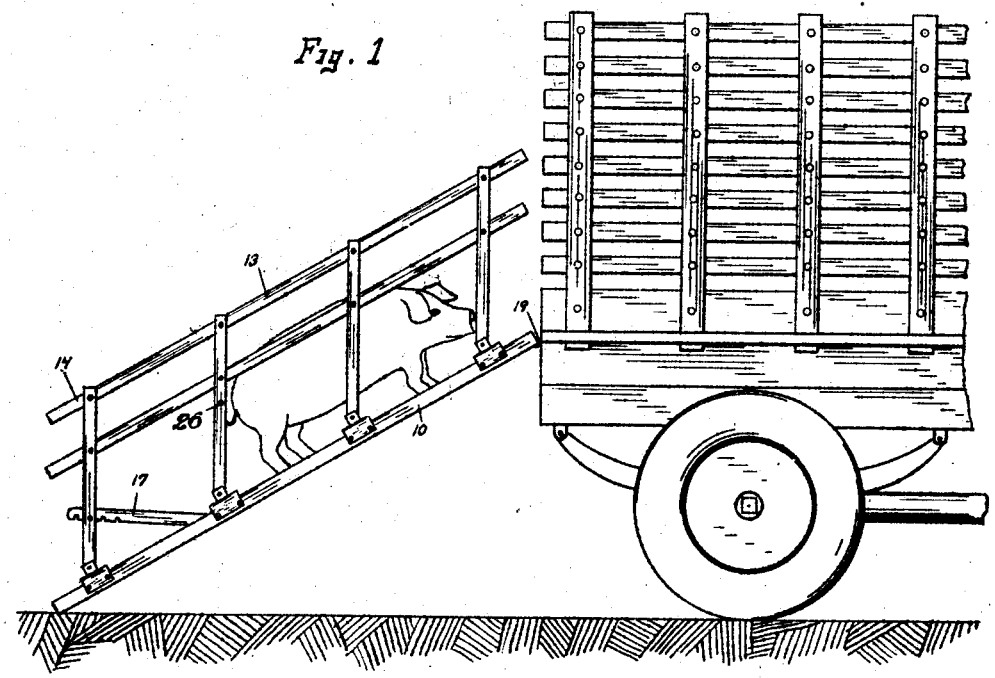
Figure 2:
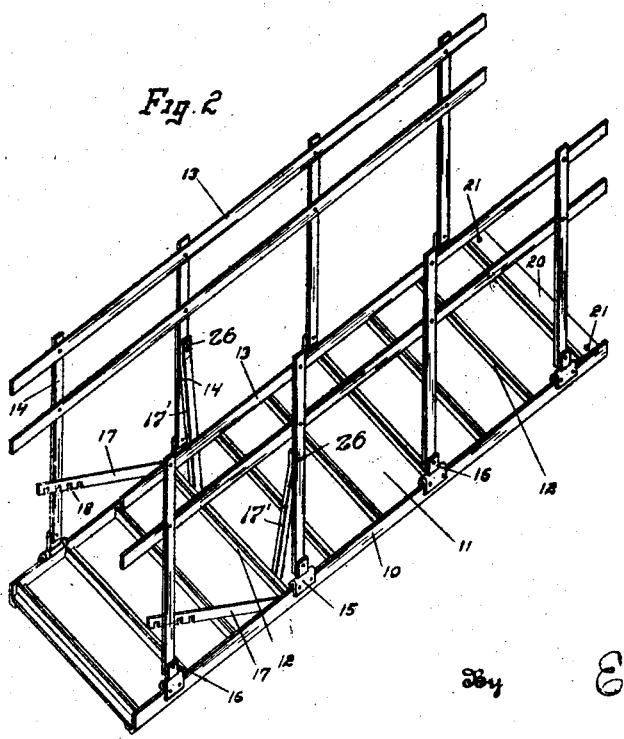
Figure 2 is a view in perspective of the chute in its position when it is ready for attachment to the truck.
Figure 3:
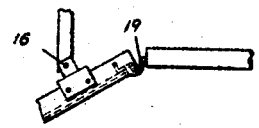
Figure 3 is a view in side elevation of the connection between the chute and the truck.

The walls of the chute consist of pivotally connected slats 13 and standards 14 having parallel movement. Secured to the side rails are hinges 15 equal in number to the number of standards 14. These hinges have their pintles in parallelism with and in close proximity with the upper edges of the side rails 10. The hinges are preferably so constructed that the movable leaves are limited in their movement to one quadrant between the vertical and the horizontal, a stop being provided for limiting the movement of these leaves in one direction to the vertical. The type of hinge shown brings the leaves into abutting relation when the hinge is swung into raised position as illustrated in Figures 2 and 3 to provide stops to limit the outward swinging movements of the walls of the chute away from each other. The standards 14 are pivotally connected to the movable leaves of the hinges 15 by means of pivots having a direction transverse with relation to the floor of the chute. It will be apparent that the standards 14 will thus have two pivotal movements, the one movement being about the pintles of the hinges 15 and the other movement being about the pivots 16. The side walls may thus be folded against the floor of the chute and they may be unfolded and then adjustably positioned so that their forward edges will be in close proximity to the rear edges of the side walls of the autotmobile truck as shown in Figure 1. This is necessary because many animals like sheep and hogs are apt to seek any opening through which to escape with the result that they would be apt to be injured unless the chute is so constructed that no opening large enough can be found. To prevent accidental collapsing of the side walls during the use of the chute I provide a pair of pivoted latching links 17 which are pivotally connected to the side rails 10 and which have each a plurality of notches 18 for engaging pins projecting inwardly from the rear standards 14.

As shown in Figure 5, each wall of the chute may be provided with a brace 17' for holding the same from collapsing when raised. These braces, as shown at the right side of Figure 5, may be detachably held in place by bolts 26 or the like, and may be disengaged and folded down beneath the walls when not in use, as shown at the left side of Figure 5.

The number of slats 13 and of standards 14 may be varied as desired between two limits. There must be a sufficient number of both of these members to prevent the animals from attempting to escape through the openings between the slats and the standards. The larger the number of these members, the smaller the size of the opening, and consequently the temptation of the animal to escape decreases with the increase in the number of slats and standards. On the other hand, the weight of the chute must be kept down in order to facilitate handling and in order to provide a light load for the automobile truck. Regardless of the number of slats 13 and standards 14, the movement of these members will always be parallel.

The truck is provided with a pair of hooks 19 which are secured preferably to the floor of the truck as shown in Figures 1, 3 and 6. The brace 20 at the upper end of the chute is provided with two apertures 21 suitably positioned for engaging the hooks 19. To use the chute therefore requires only that it be unfolded and latched and that the brace 20 be hooked over by the hook 19 after which the chute may be used for loading animals onto the automobile truck or for unloading them from the truck.

The usefulness of a chute for automobile trucks depends largely on its portability and upon the ease with which it may be stored and especially upon its accessibility when its use is required. Nearly all automobile trucks at present are provided with a space underneath the floor of the truck as shown in Figure 6 and this space is seldom if ever used. It is with particular reference to this space that I have designed my chute. To the automobile truck I secure two angle iron members 22 which are so spaced that they will readily accommodate the folded chute to form a runway upon which the chute may be slidably inserted into the position shown in Figure 6. In order to prevent the chute from sliding off during travel, I provide a latch 23 which is preferably hinged to the floor at 24, the free end of the latch being releasably secured to the automobile truck at 25.

The chute is particularly useful for loading and unloading livestock of all kinds when it is hauled to market. It is very seldom that a farm is equipped with a loading chute of just the right height for loading into an automobile truck and when such a chute is found on the farm the chute is usually in poor repair and requires considerable time before it can be put into shape for use. The chute is useful not only in loading the stock onto the truck but it is also useful when bringing stock onto the farm as it affords a simple and convenient method of unloading the stock. The automobile trucks sometimes encounter difficulties on the road to market due to breakages of parts of the truck or to poor road conditions. Trucks may often be stalled for hours at a time and it frequently becomes desirable that the animals be unloaded while the truck is being repaired or while it is being pulled out of the mire. In such cases my chute will be found to be of the utmost convenience since it is always carried with the truck and since it is available for use at all times.

Having thus described my invention in such full, clear, and exact terms that its construction and operation will be readily understood by others skilled in the art to which it pertains, what I claim as new and desire to secure by Letters Patent of the United States is:

1. In combination, an animal chute comprising a floor and a pair of collapsible side walls foldable into parallelism with said floor, said floor having a rectangular frame of a pair each of end and side rails, each of said side rails having a releasable brace pivotally secured to the inner side thereof, pins projecting from said side walls into the paths of said braces, said braces being each provided with a plurality of notches for engaging said pins for holding said side walls rigidly in upright and adjusted position, stop hinges connecting the walls to the floor and limiting the outward movement of the side walls away from each other, said hinges also having pintles positioned transversely of said chute and engaging the side walls to admit endwise movement of said side walls, and a second set of braces at the inner sides of the side walls and engaging the floor of the chute for preventing the side walls from collapsing.

2. An animal chute comprising a floor, collapsible side walls foldable into parallelism with said floor, stop hinges connecting the walls to the floor and limiting the outward movement of the side walls away from each other, said hinges also having pintles positioned transversely of said chute and engaging the side walls to admit endwise movement of said side walls, and vertically swinging braces mounted on the opposite sides of the floor and adapted to be swung upwardly against the inner sides of said side walls when the latter are raised and adjusted into endwise position, said braces and side walls having adjustably interlocking means for maintaining the side walls against collapsing and endwise movements.

In testimony whereof I affix my signature.

HAROLD W. TOOL.